Patented Feb. 18, 1947

2,415,836

UNITED STATES PATENT OFFICE 2,415,836

COMPOSITION OF MATTER SUITABLE FOR USE AS A LUBRICANT AND LUBRICANT COMPRISING THE SAME

John M. Musselman, South Euclid, Ohio, assignor to The Standard Oil Company, Cleveland, Ohio, a corporation of Ohio No Drawing. Application October 18, 1943, Serial No. 506,752

8 Claims. (Cl. 252—32.7)

This invention relates to lubricants and more particularly to lubricants suited for various uses, including high pressures or high temperatures or both, as for internal combustion engines operating at high temperatures or for lubricating heavy equipment. Such lubricants are subject to breakdowns due to sludge and acid formation.

This application is a continuation-in-part of application Serial No. 376,675, filed January 30, 1941, now Patent No. 2,331,923 and application Serial No. 455,344, filed August 19, 1942.

An object of the invention is to provide a new composition suitable for use as a lubricant or as an addition agent in lubricating oils and greases to prevent sludge and acid formation under operating conditions.

Another object is to provide an inhibitor of the above type having novel and improved characteristics.

Various other objects and advantages will be apparent as the nature of the invention is more fully disclosed.

Although the novel features which are believed to be characteristic of this invention are pointed out more particularly in the claims appended hereto, the invention will be better understood by referring to the following description in which certain specific embodiments thereof have been set forth for purposes of illustration.

In accordance with the present invention I have found that certain oxygen-containing waxes or ester waxes may be treated with a sulfide of phosphorus in such proportions and under temperature conditions to produce a novel reaction product containing sulfur and having a minimum of oxygen and phosphorus. The reaction product is separated from a sludge containing oxygen and phosphorus, probably in the form of oxides of phosphorus, along with other materials. The reaction indicated by the observed facts appears to be one in which sulfur replaces the major portion of the oxygen in the wax, and the displaced oxygen combines with the phosphorus to form a phosphorus oxide which can be removed with the sludge. The reaction product may then be reacted with a compound of an alkali metal or an alkaline earth metal to form the corresponding metal compound thereof. Such a metal compound has been found to possess characteristics suitable for use per se as a lubricant or for use as an inhibitor in various lubricating oils and greases.

It is important that the reaction between the wax and the phosphorus sulfide be carried out at a temperature above the temperature of thiophosphate formation so that a minimum of phosphorus enters into the reaction product. The reaction product, therefore, is substantially free from or has a minimum of phosphorus or thiophosphates. Also, a minimum of oxygen remains in wax, since the phosphorus eliminates the removable oxygen, probably as a phosphorus oxide.

It is also important that the amount of the phosphorus sulfide be at least equivalent to the theoretical quantity required for the sulfur to replace the entire oxygen content of the wax. Since the atomic weight of sulfur is just double that of oxygen, it is desirable to use an amount of a phosphorus sulfide, such that the weight of the sulfur therein is double the weight of the oxygen contained in the wax. An excess of a theoretical amount may be of assistance in forcing the reaction to completion. The excess preferably should not be too great since at least part of any excess remains dissolved in the reaction product and increases the sulfur and phosphorus content thereof in the molal ratio present in phosphorus pentasulfide.

When practicing the invention on a commercial scale, it is practical to form the reaction product with less than 2% of oxygen and 1.5% of phosphorus.

The process is applicable to various oxygen-containing waxes, such as degras, lanolin, beeswax, sperm oil, carnauba wax, Japan wax, Chinese wax, spermaceti, whale oil, and the like. The phosphorus sulfide, preferably, may be in the form of phosphorus pentasulfide or phosphorus sesquisulfide.

After the reaction is completed, the phosphorus oxide or oxides which separate out as a sludge, together with any other insoluble materials, may be removed from the reaction product by settling, centrifuging or filtering.

The reaction product prepared as above described may then be reacted with an alkali or an alkaline earth metal, such as potassium, sodium, lithium, rubidium, cesium, calcium, beryllium, strontium, magnesium or barium which may be in the form, preferably, of an oxide or a hydrate. These metal compounds have the property of stabilizing mineral oil against break-down and exercise a peptizing action or detergency tending to maintain the solids in suspension. They also raise the viscosity index of the oil and lower the cold test.

As a specific example, degras may be reacted with 18 to 25%, preferably about 23%, by weight of phosphorus pentasulfide at a temperature between 275° F. and 350° F., preferably 300° F. Degras has an oxygen content (by analysis) of 6 to 7%. An exothermic reaction occurs and generally a reaction time of an hour or slightly more or less is involved. This temperature is above the temperature of thiophosphate formations and may be carried out without introducing a substantial amount of phosphorus into the reaction product. The phosphorus and oxygen-containing sludge may be removed.

The reaction product, depending on the proportions of ingredients and the temperature will contain 10 to 13% sulfur, 0.75 to 1.50% phosphorus, and 0.9 to 2.0% oxygen.

The reaction product is then treated with calcium oxide or calcium hydrate to form the calcium compound thereof. This reaction may take place at around 210° F. for a period of about 2 hours.

The barium salt may be formed by similar reaction using barium oxide or barium hydrate.

The amount of the metal compound used to treat the reaction product will depend upon the characteristics desired in the final compound. In general 1.5 to 3.75% of calcium oxide or 2 to 5% of calcium hydroxide is desirable, and 5 to 15% of barium oxide or 10 to 30% of barium hydroxide is desirable, based on the wax-phosphorus sulfide reaction product. The amount expressed in terms of weight will depend upon the atomic weight of the metal, as is well understood in the art.

The amount of the metal compound also will depend upon whether the reaction product is to be completely or partially saponified. If desired, the amount of the metal compound may be such as only to partially saponify the reaction product forming a mixture of the unsaponified reaction product and the metal compound thereof. Such a mixture is advantageous under some circumstances since it embodies the peptizing features characteristic of the saponified product together with the maintenance of clean surfaces which may be attributed at least in part to the presence of polar groups in the unsaponified portion.

The reaction product may also be treated with a plurality of metals selected from the alkali metal and alkaline earth metal groups. The combination of an alkali metal and an alkaline earth metal produces compounds or mixtures of compounds having desirable properties for certain uses. Examples are sodium and potassium with calcium and barium. Also, if desired, any other two metals may be used in admixture, such as calcium and barium. The mixture of two metals may also be used when the reaction product is only to be partly saponified.

If an alkaline earth metal compound of the reaction product is to be formed, instead of using an alkaline earth oxide or hydrate, the initial reaction product may be neutralized with caustic soda or potash and the resulting salt may be then reacted with an alkaline earth metal salt, such as a chloride to replace all or a part of the sodium and to form the desired metal compound.

The above composition has been found suitable for use as a lubricant per se and is particularly effective as an inhibitor when used even in small percentages in lubricating oil.

The amount of the above described metal compound of the reaction product to be added to the oil or grease will depend on the characteristics of the oil or grease and its intended use. Some oils have more of a tendency to form acid and sludge than others and such oils require large quantities of the addition agent. Also, oils that are intended for high temperature use, especially in the presence of prooxidant catalyst require larger amounts. In general the range is from 1 to 10%, but under some circumstances amounts as small as 0.01% show a remarkable improvement. Since the addition agent is a lubricant itself there is no upper limit to the amount that may be added to an oil.

An S. A. E. 20 lubricating oil containing 5% of the barium salt above referred to, when subjected to a standard twenty hour test in an Ethyl Gasoline Corporation type test engine, showed no sludge, an acid number of 0.56, a viscosity increase of 35 and no deposit on the piston skirt. In contrast, the same S. A. E. 20 oil without the addition agent and under similar conditions, showed at the end of 20 hours 4% sludge, acid number 2.10, viscosity increase of 413 and piston skirt rating 7.0.

The particularly excellent peptizing action or detergency of the barium compound is shown by the test method measuring the ability of the lubricant to maintain carbon black in suspension. A 1% carbon black suspension in S. A. E. 20 Mid-Continent oil, by such a test, was entirely settled out after 20 hours standing. A similar S. A. E. Mid-Continent oil, to which 5% of the above described barium compound was added, maintained the carbon black in suspension 250 hours. The metal compounds of the present invention are particularly valuable for addition to mineral oils suitable for Diesel type engine operation where products of composition produce materials tending to block up small openings.

As indicative of the improvement of an oil containing the metal compounds of the invention in passing the cold test, an S. A. E. 20 Mid-Continent lubricating oil showing an A. S. T. M. cold test of +20° F., on addition of 5% of the above described barium compound showed a cold test of −15° F.

As a further illustration of the invention, degras was reacted with 23% of phosphorus pentasulfied at 300° F. for 2 hours, and the sludge formed was then separated. The reaction product was then saponified with a mixture of lime and potash in amounts such that equal molar quantities of each were used (3% of calcium hydroxide and 4.5% of potassium hydroxide). These quantities were such as to produce a soap having a pH value of 7 or slightly higher, indicating complete saponification. After saponifying, the metal compound of the reaction product was filtered and added to a Mid-Continent S. A. E. 30 motor oil in an amount of 3%. This was then subjected to a standard 20 hour test in an Ethyl Gasoline Corporation type test engine. At the conclusion of the run, the sludge was 0.50%; the acid number was 0.52; the viscosity increase was 33; and the skirt rating number was 0.0. In contrast, the same S. A. E. 30 oil, without the addition agent, was run under identical conditions and showed 4.00% sludge; and acid number of 4.50; a viscosity increase of 350; and a skirt rating number of 8.0 to 10.0.

If it is desired, additional sulfur may be incorporated into the reaction product for increasing the total sulfur content. Experience has shown that such sulfur can be added either to the wax-sulfide reaction product or to the metal compound thereof. It is believed that such a reaction is one of adding sulfur to the sulfur already present, perhaps to form disulfides or polysulfides.

While a particular embodiment of the invention has been described, it will be understood

I claim:

1. The process for making a composition suitable for use as a lubricant and as an addition agent to improve the characteristics of lubricating oils and greases, comprising reacting a phosphorus sulfide with an oxygen-containing wax at a temperature of at least 275° F. to prevent thiophosphate formation and to remove the major portion of oxygen in the wax by reaction with the phosphorus in the sulfide, removing the phosphorus and oxgen-containing sludge from the reaction product, and reacting said product with a compound of a metal selected from the alkali and alkaline earth groups to form the corresponding metal compound of said reaction product.

2. The process for making a composition suitable for use as a lubricant and as an addition agent to improve the characterisitcs of lubricating oils and greases, comprising reacting phosphorus pentasulfide with degras at a temperature of at least 275° F. to prevent thiophosphate formation and to remove the major portion of the oxygen in the degras by reaction with the phosphorus in the sulfide, removing the phosphorus and oxygen-containing sludge from the reaction product, and reacting said product with a compound of a metal selected from the alkali and alkaline earth groups to form the corresponding metal compound of said reaction product.

3. The process for making a composition suitable for use as a lubricant and as an addition agent to improve the characteristics of lubricating oils and greases, comprising reacting phosphorus pentasulfide with degras at a temperature of at least 275° F. to prevent thiophosphate formation and to remove the major portion of the oxygen in the degras by reaction with the phosphorus in the sulfide, removing the phosphorus and oxygen-containing sludge from the reaction product, and reacting said product with lime to form the calcium compound of said reaction product.

4. The process for making a composition suitable for use as a lubricant and as an addition agent to improve the characteristics of lubricating oils and greases, comprising reacting a phosphorus sulfide and an oxygen-containing wax in proportions such that the sulfur in the sulfide is at least stoichiometrically as great as the oxygen in the wax and at a temperature of at least 275° F. such that the major portion of the oxygen in the wax is combined with the phosphorus in the sulfide, removing the phosphorus and oxygen-containing sludge from the wax-sulfur reaction product, and reacting said wax-sulfur product with a metal compound selected from the group consisting of alkali metal and alkaline earth metal compounds to form the corresponding metal compound of said reaction product.

5. The process for making a composition suitable for use as a lubricant and as an addition agent to improve the characteristics of lubricating oils and greases, comprising reacting a phosphorus sulfide and an oxygen-containing wax in proportions such that the sulfur in the sulfide is at least stoichiometrically as great as the oxygen in the wax and at a temperature of at least 275° F. such that the major portion of the oxygen in the wax is combined with the phosphorus in the sulfide, removing the phosphorus and oxygen-containing sludge from the wax-sulfur reaction product, and reacting said wax-sulfur product with a compound selected from the group consisting of alkali metal and alkaline earth metal oxides and hydroxides to form the corresponding metal compound of said reaction product.

6. The process for making a composition suitable for use as a lubricant and as an addition agent to improve the characteristics of lubricating oils and greases, comprising reacting a phosphorus sulfide and an oxygen-containing wax in proportions such that the sulfur in the sulfide is at least stoichiometrically as great as the oxygen in the wax and at a temperature of at least 275° F. such that the major portion of the oxygen in the wax is combined with the phosphorus in the sulfide, removing the phosphorus and oxygen-containing sludge from the wax-sulfur reaction product, and reacting said wax-sulfur product with a compound selected from the group consisting of alkali metal and alkaline earth metal oxides and hydroxides in an amount sufficient to saponify at least a part of said wax-sulfur reaction product.

7. The process for making a composition suitable for use as a lubricant and as an addition agent to improve the characteristics of lubricating oils and greases, comprising reacting phosphorus pentasulfide and degras in proportions such that the sulfur in the sulfide is at least stoichiometrically as great as the oxygen in the degras and at a temperature of at least 275° F. such that the major portion of the oxygen in the degras is combined with the phosphorus in the sulfide, removing the phosphorus and oxygen-containing sludge from the degras-sulfur reaction product, and reacting said degras-sulfur product with a compound selected from the group consisting of alkali metal and alkaline earth metal oxides and hydroxides to form the corresponding metal compound of said reaction product.

8. The process for making a composition suitable for use as a lubricant and as an addition agent to improve the characteristics of lubricating oils and greases, comprising reacting phosphorus pentasulfide and degras in proportions such that the sulfur in the sulfide is at least stoichiometrically as great as the oxygen in the degras and at a temperature of at least 275° F. such that the major portion of the oxygen in the degras is combined with the phosphorus in the sulfide, removing the phosphorus and oxygen-containing sludge from the degras-sulfur reaction product and reacting said degras sulfur product with lime in an amount sufficient to saponify at least a part of said degras-sulfur reaction product.

JOHN M. MUSSELMAN.

REFERENCES CITED

The following references are of record in the file of this patent:

UNITED STATES PATENTS

| Number | Name | Date |
|---|---|---|
| 2,331,923 | Musselman | Oct. 19, 1943 |
| 2,322,307 | Neely et al. | June 22, 1943 |
| 2,316,088 | Loane et al. | Apr. 6, 1943 |
| 2,316,081 | Loane et al. | Apr. 6, 1943 |
| 2,237,096 | Dearborn | Apr. 1, 1941 |
| 2,242,260 | Prutton | May 20, 1941 |